(12) United States Patent
Gretz

(10) Patent No.: US 6,460,813 B1
(45) Date of Patent: Oct. 8, 2002

(54) ONE-PIECE HOLDER FOR SUSPENDING ELONGATED OBJECTS

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/999,458

(22) Filed: Nov. 23, 2001

(51) Int. Cl.⁷ .................................................. F16L 3/00
(52) U.S. Cl. ........................................ 248/62; 248/74.2
(58) Field of Search .............................. 248/62, 63, 71, 248/74.2, 74.1, 300

(56) References Cited

U.S. PATENT DOCUMENTS

| | | | | |
|---|---|---|---|---|
| 1,579,418 A | * | 4/1926 | Tomkinson | |
| 2,166,916 A | * | 7/1939 | Lombard | |
| 2,366,456 A | * | 1/1945 | Pheazey | |
| 2,721,050 A | * | 10/1955 | Sams | |
| 4,379,537 A | * | 4/1983 | Perrault et al. | |
| 4,479,625 A | * | 10/1984 | Martz | |
| 4,802,646 A | * | 2/1989 | Cattani | |
| 5,533,696 A | * | 7/1996 | Laughlin et al. | |
| 6,216,987 B1 | * | 4/2001 | Fukuo | |
| 6,257,530 B1 | * | 7/2001 | Tsai | |

* cited by examiner

*Primary Examiner*—Korie Chan

(57) ABSTRACT

This invention is a holder for suspending elongated objects from overhead equipment struts. The holder comprises a generally U-shaped metallic band formed at the ends of its legs into a generally circular band. The utmost ends of the legs of the U-shaped band have complementary end devices that interlock to hold the elongated object in place.

1 Claim, 1 Drawing Sheet

ONE-PIECE HOLDER FOR SUSPENDING ELONGATED OBJECTS

BACKGROUND OF THE INVENTION

Field of the Invention

This invention is in the field of devices for holding elongated objects in buildings and other structures, particularly devices that actually hold the elongated object.

BRIEF SUMMARY OF THE INVENTION

It is common in the building industry to hold pipe, cable and other elongated objects by using clamps. A special member is used to hold the elongated objects. The invention is a one-piece holder for the elongated objects. It consists of a single metallic band that is shaped into a generally circular enclosure for the elongated objects with a base that attaches to an interfacing device or is integral therewith. The two ends of the band interlock to hold the elongated objects in place

DETAILED DESCRIPTION OF THE INVENTION

The invention is a holder for use in holding pipe, cable and other elongated objects in buildings and other structures. For the sake of simplicity the elongated objects will be referred to as 'cable' herein but it is to be understood this term encompasses any type of generally elongated object which may be held.

Figure 1:
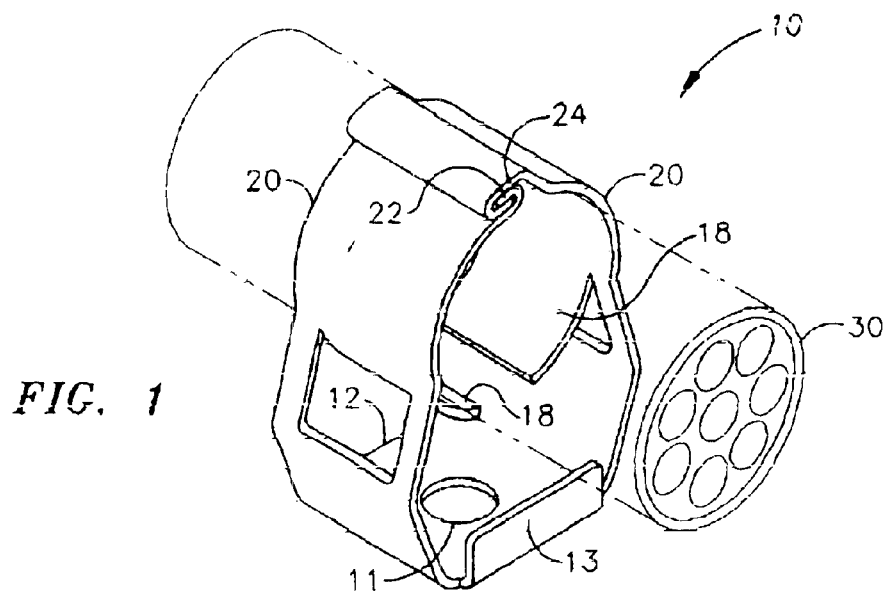
FIG. 1 is a perspective view of the holder of the invention with the circular ends of the band locked around a cable.
Figure 2:
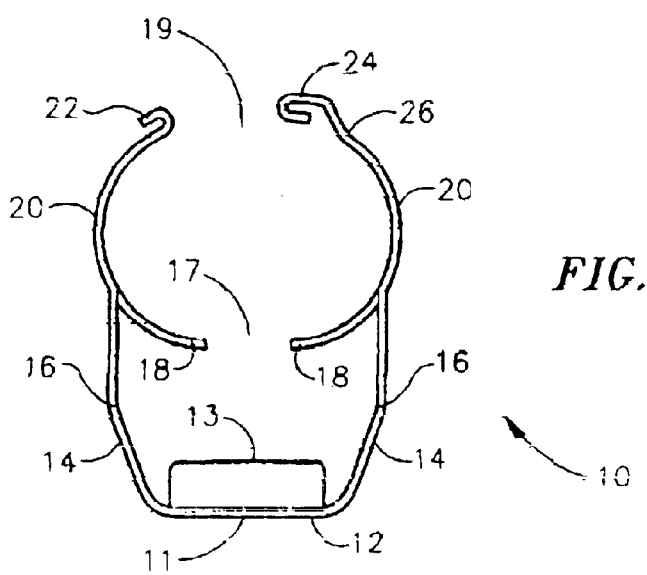
FIG. 2 is a front elevation of the holder with the ends of the band open.
Figure 3:
FIG. 3 is a magnified view of the end of one of the bands in FIG. 2.
Figure 4:
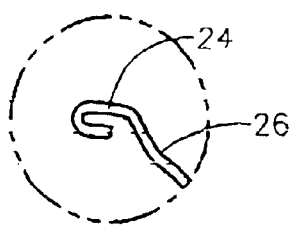
FIG. 4 is a magnified view of the end of the other band in FIG. 2.

FIG. 1 shows the holder 10 of the invention with a cable 30 in place, the cable being shown in phantom for clarity. The holder 10 consists of a single metallic band formed into the shape of a generally flat-bottomed U with a generally flat, rectangular base 12. The base 12 has a hole 11 formed in it for fastening the holder 10 to a support. The base 12 also has a tab 13 formed perpendicular to the plane of the base 12 which serves to stiffen it. First and second similar support legs 14 form the sides of the U-shape, each having a knee 16 to allow the holder 10 to flex somewhat side-to-side and up-and-down. At approximately its midpoint each leg 14 has a portion cut or lanced out and bent inwardly to form arcuate support tabs 18. The portions of each of said first and second legs 14 beyond the arcuate support tab 18 and near the termini or outer ends are formed into arcuate shapes complementary with the arcuate support tabs 18 to form a generally circular band 20 with a gap 19 on the outside to receive cable 30 and a gap 17 of minimal length on the inside. The utmost ends or termini of the legs 14 have complementary end devices 22 and 24. In the best mode contemplated the end device 22 is a return bend outward as shown magnified in FIG. 3. The end device 24 on the other side shown in FIG. 4 comprises a jog 26 followed by a return bend inward.

In using the invention, holder 10 would be fastened to a support, for example by a screw inserted through hole 11 in the base 12 into the support. The gap 19 would then be spread sufficiently to receive the cable 30. Once the cable 30 contacts the ends of the arcuate tabs 18 the end devices 22 and 24 are squeezed together until they interlock in a more or less permanent fastened relationship to hold the cable 30 in position. The end devices 22 and 24 are such that when locked together the jog 26 allows them to nest so that they protrude minimally either inside or outside the band 20.

If it were ever necessary to remove the cable 30 from the holder 10, the end devices 22 and 24 can be pried apart.

The material of the holder 10 could be any suitable resilient material but is preferably spring steel.

The advantages of this invention are simplicity and low cost. Manufacture would require a minimum of stamping and bending steps. Installation is eminently simple.

What is claimed is:

1. A one-piece hanger for elongated objects comprising:
   a single resilient band formed into the shape of a generally flat-bottomed U to form a flat generally rectangular base;
   first and second legs of said U each of which legs has a terminus;
   first and second arcuate support tabs formed inwardly from said first and second legs at approximately the midpoints of said first and second legs;
   first and second arcuate shapes adjacent the termini of said first and second legs;
   said first and second arcuate support tabs and said first and second arcuate shapes forming a generally circular band to encircle partially and hold in place an elongated object;
   each leg of said U having said terminus end formed into a first end device at the terminus of said first leg and a second end device at the terminus of said second leg with both end devices adapted to engage each other;
   a tab bent up on at least one side thereof of said rectangular base with said tab generally perpendicular to the plane of the rectangular base; and
   said first end device is a return bend outward and said second end device comprises a jog outward from the plane of the band followed by a return bend inward.

* * * * *